(12) United States Patent
Rastogi et al.

(10) Patent No.: US 8,411,971 B1
(45) Date of Patent: Apr. 2, 2013

(54) METHOD AND APPARATUS FOR NORMALIZING PERCEPTUAL QUALITY IN MEDIA COMPRESSION

(75) Inventors: Anubha Rastogi, Noida (IN); Balaji Krishnamurthy, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 261 days.

(21) Appl. No.: 13/024,080

(22) Filed: Feb. 9, 2011

(51) Int. Cl.
*G06K 9/36* (2006.01)
(52) U.S. Cl. ....................................... 382/232
(58) Field of Classification Search .................. 382/232, 382/233, 240, 251; 358/1.2, 1.13
See application file for complete search history.

(56) References Cited

U.S. PATENT DOCUMENTS
7,639,886 B1 12/2009 Rastogi

*Primary Examiner* — Duy M Dang
(74) *Attorney, Agent, or Firm* — Moser Taboada

(57) ABSTRACT

Embodiments include a computer implemented method and apparatus for normalizing perceptual quality in media compression. In one embodiment, a computer implemented method for normalizing perceptual quality in media compression includes determining a maximum bit rate for a target media file, determining a quality setting for the target media file, and compressing the media file to a bit rate equal to the specific percentage of the maximum bit rate multiplied by the maximum bit rate using the computer. The quality setting is a specific percentage of the maximum bit rate.

20 Claims, 4 Drawing Sheets

METHOD AND APPARATUS FOR NORMALIZING PERCEPTUAL QUALITY IN MEDIA COMPRESSION

BACKGROUND

1. Technical Field

Embodiments generally relate to a media compression and, more particularly, to a method and apparatus for normalizing perceptual quality in media compression.

2. Description of the Related Art

As various forms of digital media recorders, such as digital cameras, camcorders, and voice recorders have become widely available to the public, more and more users are becoming familiar with digital media editing techniques. As technology has advanced, so has the resolution of the media capturing devices. With modern camera technology exceeding 10 megapixels in capture resolution, it is common for a single image produced in a lossless format to exceed 14 megabytes in size. These large file sizes consume large amounts of storage space, are difficult to transmit, and take additional time to load for viewing. As such, it is common for photo editing software to provide options to the user to allow for compression of the media into a smaller file format. However, compression into a smaller file format typically includes a tradeoff in media quality. In other words, the smaller the output file, the larger the loss in subjective image quality. Certain image types are more amenable to such compression than others. For example, images including text are typically more susceptible to quality loss (i.e. distortion caused by compression is more noticeable) than photographs.

While a user may currently choose a particular quality setting to which to compress a given image, the process of determining an acceptable size/quality level is fraught with trial and error. Current compression methods allow the user to specify either a target bit rate or target peak signal-to-noise ratio. Unfortunately, the subjective quality from image-to-image can vary widely even with the same bit rate or peak signal-to-noise ratio. As such, a particular setting for a given image format is not determinative for maintaining a consistent quality across multiple images in the same format. Because of the trial and error nature of this process, compressing many images at a time is difficult, if not impossible, to perform in a reasonable amount of time. As such, there is a need in the art for a method and apparatus for normalizing perceptual quality in media compression.

SUMMARY

Various embodiments of the present disclosure include a computer implemented method and apparatus for normalizing perceptual quality in media compression. In one embodiment, a maximum bit rate for a target media file is determined. A quality setting for the target media file is determined. A target media file is compressed to a bit rate equal to the specific percentage of the maximum bit rate multiplied by the maximum bit rate using the computer.

Figure 1:
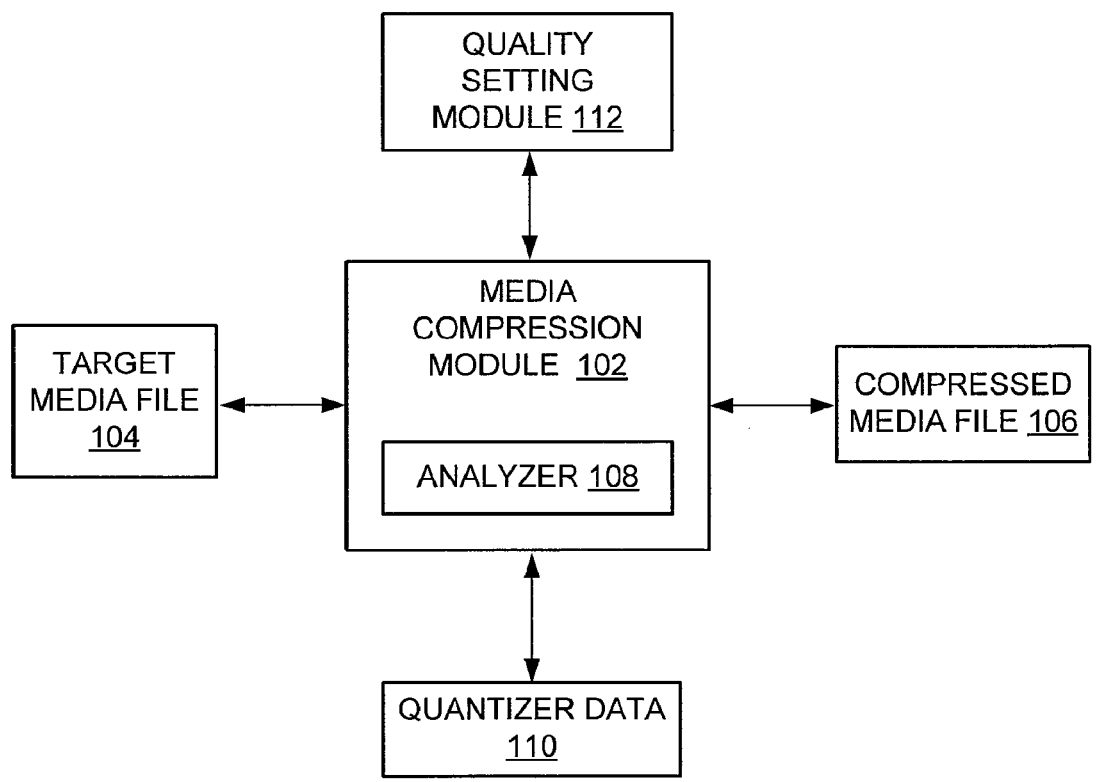
FIG. 1 is a block diagram of a system for normalizing perceptual quality in media compression in accordance with embodiments of the present invention.

While the method and computer readable medium for normalizing perceptual quality in media compression are described herein by way of example for several embodiments and illustrative drawings, those skilled in the art will recognize that the method and computer readable medium for normalizing perceptual quality in image compression are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and computer readable medium for normalizing perceptual quality in image compression as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

In brief, embodiments of the invention provide for a method and apparatus for normalizing perceptual quality in media compression. Digital media, such as audio, video, and images, is typically provided in a number of different formats. A particular media file is encoded in a given format that may be associated with a particular compression mechanism. The compression mechanism is often associated with a codec used to create the particular media file. Some codecs are "lossless" in that there is no distortion of loss of data when the lossless codec is used to encode a particular media file. However, such lossless codecs are not space efficient, as storing data at a high enough resolution to avoid loss of data requires a significant amount of storage capacity. As such, so-called "lossy" codecs are increasingly popular for the encoding of media files. These lossy codecs provide for compression of media files in a manner that attempts to decrease file size while also minimizing the amount of distortion and data loss caused by the compression operation. Examples of such lossy compression methods include JPEG, JPEG2000, MPEG, MPEG2, WINDOWS MEDIA AUDIO (WMA), and the like.

In addition to different levels of loss and distortion caused by the use of different codecs, the content of an individual file may determine how susceptible the file is to compression. In some situations involving an image containing text with a significant amount of whitespace, image distortion caused by the compression can be perceived to be much higher than a similar distortion in a natural image. The difference in perception occurs because, in a natural image, there are large variations in color and luminosity in neighboring pixels that mask compression-related errors. Text files are typically compressed using different techniques than for natural images, such as JBIG2 compression or OCR techniques. If one uses transform coding to compress text, such as Discrete Cosine Transform (DCT) or wavelet transforms, then the text typically becomes more distorted than a natural image compressed using the same technique. This distortion typically occurs because there is a very sharp edge between the text characters and the white space of the document. Also, color in a text document is typically more uniform across the text or white space regions. The human eye is more perceptive of even minor distortions in text since the eye is accustomed to seeing a sharp edge. Minor changes to the surrounding area can alter the text character beyond recognition. In the case of natural images, the edge between various objects is fuzzier. Our eye is more forgiving of errors in edges in natural images.

As such, a text image file and a natural image file of the same origin file size, compressed to the same output bit rate using the same encoding methods, may possess a significant variation in subjective perceptual quality for the viewer.

Embodiments of the invention operate by normalizing the perceptual quality of compressed media by calibrating the compression algorithm to a percentage of maximum file size, rather than a given particular bit rate. In this manner, multiple compression operations can be performed in a batch process without the need to individually recalibrate the compression algorithm for each media file, while also maintaining perceptual quality across media files. The method achieves this calibration by first compressing each file to a maximum quality level. In other words, the quantizer element of the compression algorithm is set at the minimum value, resulting in a media file output of the highest quality and maximum bit rate. The method then uses this maximum bit rate as a calibration measure. Output quality of the compression algorithm is thus determined as a percentage of the maximum possible bit rate, rather than an objective bit rate.

Various embodiments of a method and apparatus for normalizing perceptual quality in media compression are disclosed herein. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated or transformed. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," "identifying," or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. The terms "processes," and "applications" refer to instances of computer programs. One of ordinary skill in the art would recognize that a single application might be made of multiple processes. When an application is executed, the execution path becomes one or more corresponding processes executed by the processor in conjunction with the operating system.

The term "media" is used to describe any type digital file containing an audio or visual component, including but not limited to audio, video, and image files. While the examples given within this application primarily relate to the methods as applied to image and video media files, one of ordinary skill in the art would recognize that the methods described herein would be broadly applicable to any sort of media for which a non-lossless compression codec has a rate-distortion curve which is fully normalizable.

Embodiments of the present invention might also be advantageously used to compress key frames in a video or remote meeting clients that perform screen capture of a user's desktop. The methods by which the media compression module performs this process are described further with respect to FIG. 2-4.

FIG. 1 is a block diagram of a system 100 for normalizing perceptual quality in media compression. Exemplary embodiments of the system 100 may be implemented in a computer system that includes desktop computers, laptops, tablet computer, smart phones, personal digital assistants (PDAs), cellular phones, and the like. One embodiment of the computer system is described in detail with respect to FIG. 5. In some embodiments, the system 100 operates to perform the methods described with respect to FIGS. 2, 3, and 4.

The system 100 may function as a means to perform media compression operations in accordance with embodiments of the present invention, with the various software elements and/or modules given structure in execution using the system 100 and one or more processors therein. The various software modules include a media compression module 102. The execution of the media compression module 102 causes a general purpose computer, such as the system 100, to operate as a specific purpose computer for performing media compression operations.

The media compression module 102 operates to perform compression operations on one or more media files. In some embodiments, the media compression module 102 converts a target media file 104 into a compressed media file 106. In some embodiments, the media compression module 102 compresses the target media file 104 using a different codec and/or file type in order to change a bit rate of the target media file 104. In some embodiments, the media compression module 102 includes various software modules, such as an analyzer 108. The analyzer 108 performs a media compression analysis on the target media file 104 to determine the bit rate of the target media file 104 when the target media file 104 is compressed using a minimum level of quantization (i.e. a quantizer of 1). The analyzer 108 thus operates to determine the maximum perceptual quality which the methods of FIGS. 2, 3, and 4 use to calibrate compression operations.

The media compression module 102 accesses various data, such as a quantizer data 110 as well as a quality setting from a quality setting module, to normalize the perceptual quality of the target media file 104. The quanitizer data 110 is used to determine a smallest quantizer value for a destination format associated with the target media file 104 (i.e., a format of the compressed media file 104). The quantizer data 110 includes quantizer values in which each quantizer value reflects a compression setting used to determine a size and amount of data loss associated with the compressed media file 106 during the compression operation on the target media file 104.

A quantizer value, for example, refers to a quality or resolution setting used during the compression operation. A size of the quantizer value determines a size of the "slice" or resolution of a scale used to generate the compressed media file 106 from the target media file 104. As such, the smaller quantizer value will result in a higher resolution image than with a larger quantizer value, and thus a larger file size with a higher quality than a larger quantizer value. The quantizer value is thus equivalent to a denominator value of a fraction, with the file size of the target media file 104 as the numerator. The denominator value of one (1) represents the compressed media file 106 as a copy of the target media file 104 with a minimum level of compression afforded by a given compression codec.

In some embodiments, the media compression module 102 allows for the user to adjust the quality setting of the compressed media file 106 via the quality setting module 112. The quality setting module 112 implements a user interface for the media compression module 102 to which the user communicates a desired quality setting. The quality setting refers to an output quality scale in accordance with the methods as discussed with respect to FIGS. 2, 3, and 4. As discussed in detail below, the quality scale represents a percentage of the maximum potential bit rate of the compressed media file 106 as determined by the analyzer 108.

Figure 2:
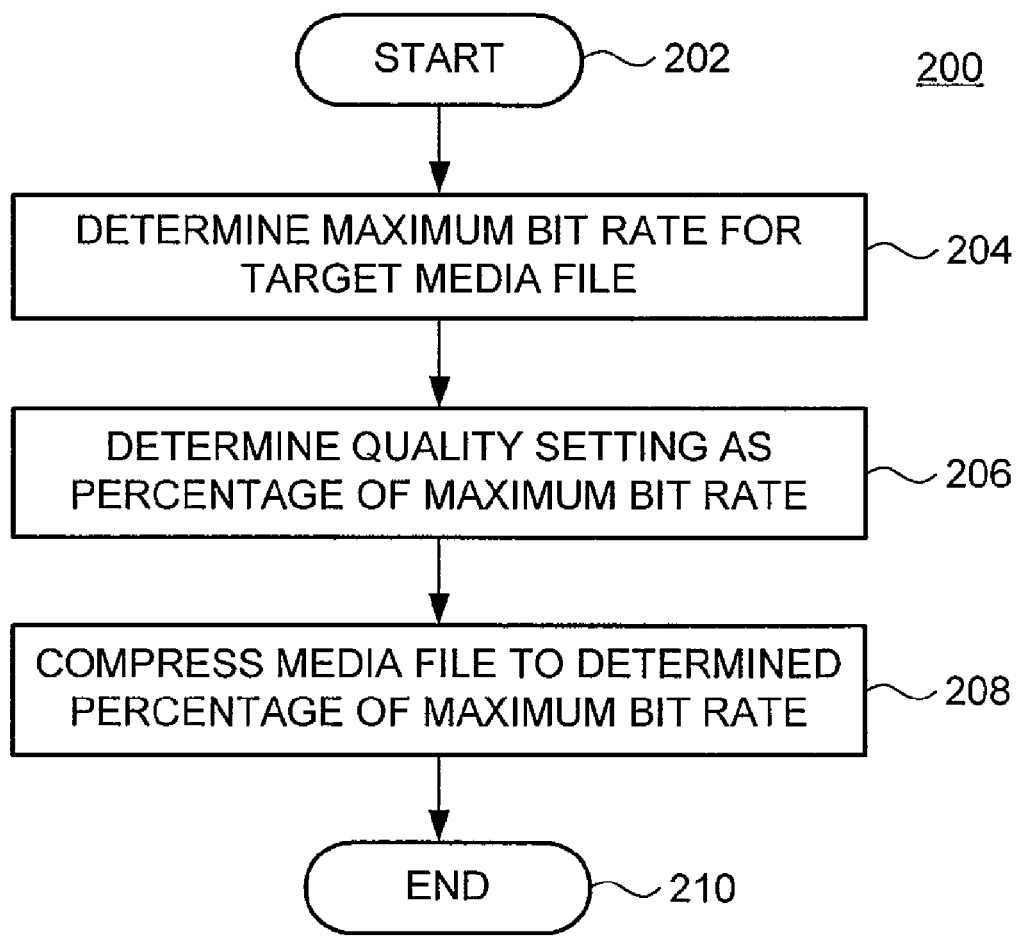
FIG. 2 is a flow diagram depicting a method for normalizing perceptual quality in media compression using a computer system implementing the system described with respect to FIG. 1 in accordance with embodiments of the present invention.

FIG. 2 is a flow diagram of a method 200 for normalizing the perceptual quality in media compression. Each and every step of the method 200 may be implemented using a system (e.g., the system 100 of FIG. 1) that includes a media compression module (e.g., the media compression module 102 as described with respect to FIG. 1). In other embodiments, some steps are omitted or skipped. The system may include a computer system as described further below.

The method 200 begins at step 202 and proceeds to step 204. In some embodiments, the media compression module includes an analyzer (e.g., the analyzer 108 of FIG. 1) for performing step 204. At step 204, the method 200 analyzes a target media file to determine a maximum bit rate for a particular compression operation that uses a particular codec. In some embodiments, the method 200 determines the maximum bit rate by determining a smallest quantizer for the destination format of the target media file. For example, a quantizer value of one (1) would typically be used to determine the maximum bit rate of the target media file. A quantizer value of one (1) would describe a one (1) to one (1) ratio between the target media file and a destination or compressed media file. The smallest quantizer value and, hence the maximum bit rate, depend upon a destination file type and/or codec of the target media file. After determining the maximum bit rate for the image, the method 200 proceeds to step 206.

At step 206, the method 200 determines a quality setting as a percentage of the maximum bit rate. For example, the user may be presented with a "quality slider" scale from 1 to 10, with 1 being the lowest quality, and 10 being the highest. As such, a quality setting of 5 would correspond to a target bit rate of the media file at 50% of the maximum bit rate for the image. As such, in the case where the maximum bit rate of the image would produce a compressed media file size of 100 kb, a 50% quality setting would produce a compressed media file with a size of 50 kb. In the case where the maximum bit rate of the image would produce a compressed media file size of 200 kb, a 50% quality setting would produce a compressed media file with a size of 100 kb. Such compression results in similar subjective image quality between the two files, despite their different compressed sizes. After determining a target bit rate as a percentage of the maximum bit rate, the method 200 proceeds to step 208.

At step 208, the method 200 compresses the target media file to the target bit rate as determined at step 206, corresponding to a specified percentage of the maximum bit rate. The compression operation results in a compressed media file, which is then stored on the local computer system or transmitted to a remote computer system. The method 200 compresses the target media file to a bit rate equal to a percentage of the maximum bit rate for which there is little/no loss in subjective image quality, rather than requiring the user to specify an objective bit rate or peak signal-to-noise ratio. After converting the target media file and storing or transmitting the compressed media file, the method 200 ends at step 210.

As an illustrative example, one encoding format that allows for a fine rate-distortion optimization in accordance with embodiments of the invention is the JPEG2000 format. In order to compress an image where the bit-budget (i.e. the desired file size) is known, the encoding operation must first compress the image to a very high quality (and consequently a large file size). The high quality compression may be accomplished by using a quantizer value of one (1), resulting in a minimally compressed image. A rate-distortion algorithm operates on the compressed bit stream (i.e. the file compressed with the quantizers of 1) and determines the optimal subset of bits to retain so that the size of the chosen subset is within the bit-budget. The selected bits are stored in a second compressed bit stream (e.g., a media file) having a bit rate equal to the target bit rate. When the selected bits are decoded, the image is viewable with the best possible quality. The compression algorithm implicitly quantizes the wavelet coefficients in an adaptive manner. Normally, coefficients of a wavelet sub-band are quantized (divided by) a single quantizer value. The rate-distortion optimization algorithm implicitly allows each coefficient to be quantized differently depending upon how much the specific coefficient contributes to the quality of the decoded image.

Video compression formats like H.264 also provide the facility to perform similar rate-distortion optimizations. At the very basic level, as long as the compression format offers a method of varying the quality of the compressed image, embodiments of the invention can operate to use the compression algorithm to compress to the media to the maximum possible quality, and then choose the quality level that yields a file size that is closest to the desired percentage of quality.

Figure 3:
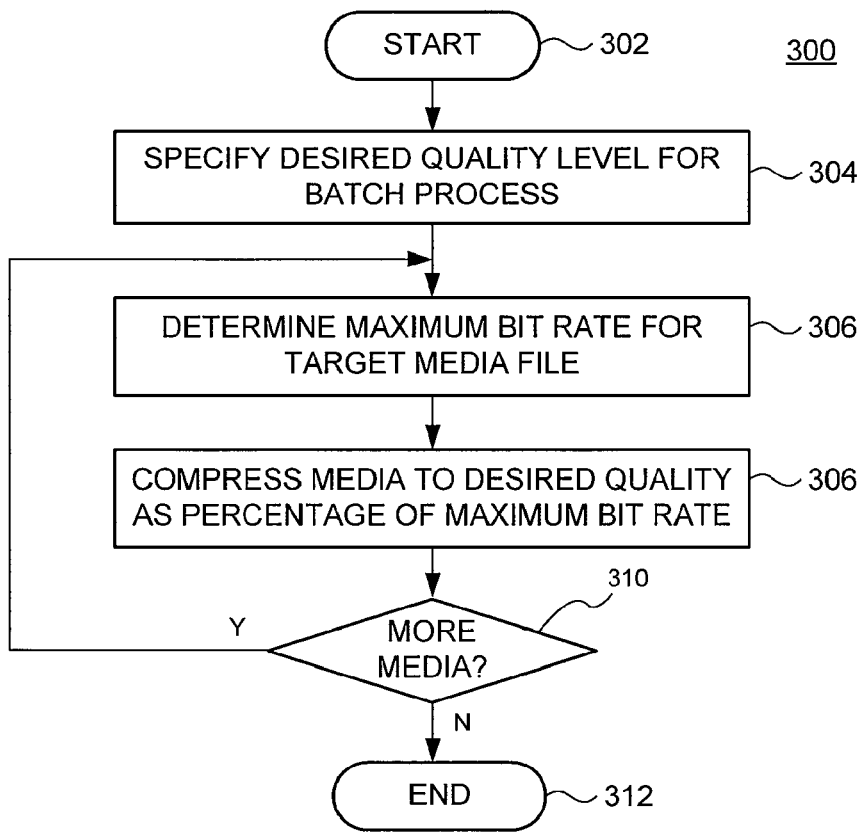
FIG. 3 is a flow diagram depicting a method for performing a batch compression job while normalizing perceptual quality using a computer system implementing the system described with respect to FIG. 1 in accordance with embodiments of the present invention.

FIG. 3 is a flow diagram of a method 300 for performing a batch compression job of one or more media files while also normalizing the perceptual quality of said media files. Each and every step of the method 300 may be implemented using a system (e.g., the system 100 of FIG. 1) that includes a media compression module (e.g., the media compression module 102 as described with respect to FIG. 1). In other embodiments, some steps are omitted or skipped. The system may include a computer system as described further below.

The method 300 begins at step 302 and proceeds to step 304. At step 304, the method 300 determines a desired quality level for the media files that are to be compressed. The user inputs data via a user interface (e.g., the quality level module 112 of FIG. 1) indicating the desired quality level. For example, a user may select a quality level according to a scale from one (1) to 10 in which a quality level of one (1) represents a lowest quality and a quality level of ten (10) represents a highest quality. One of ordinary skill in the art would recognize that a variety of quality scales would be possible to implement to control the percentage of maximum bit rate for performing the compression operation. The desired quality level directly corresponds to a percentage of the maximum bit rate of the target media file. For example, a quality level of five (5) would be associated with 50% of the maximum bit rate of the current target media file. After the desired quality level is specified, the method 300 proceeds to step 306.

At step 306, the method 300 determines the maximum bit rate for the current target media file. For example, the media compression module instructs an analyzer (e.g., the analyzer 108 of FIG. 1) accesses quantizer data (e.g., the quanitizer data 110 of FIG. 1) and determines a smallest quantizer value associated with a destination format. After determining the maximum bit rate for the target media file, the method 300 proceeds to step 308.

At step 308, the method 300 compresses the target media file to the bit rate corresponding to the quality level as specified at step 304. For example, if the maximum bit rate of the target media file is 100 kb and the desired quality level is 5 on a scale of 1 to 10, the method 300 would compress the file to a bit rate of 50 kb. The compression operation results in a compressed media file, which is then stored on the local computer system or transmitted to a remote computer system. After converting the target media file and storing or transmitting the compressed media file, the method 300 then proceeds to step 310.

At step 310, the method 300 determines if additional media files must be compressed using the specified desired quality level. If there are more media files to compress, the method 300 proceeds to step 306 to repeat the process for each additional media file. If there are no additional media files, the method 300 ends at step 312.

Figure 4:
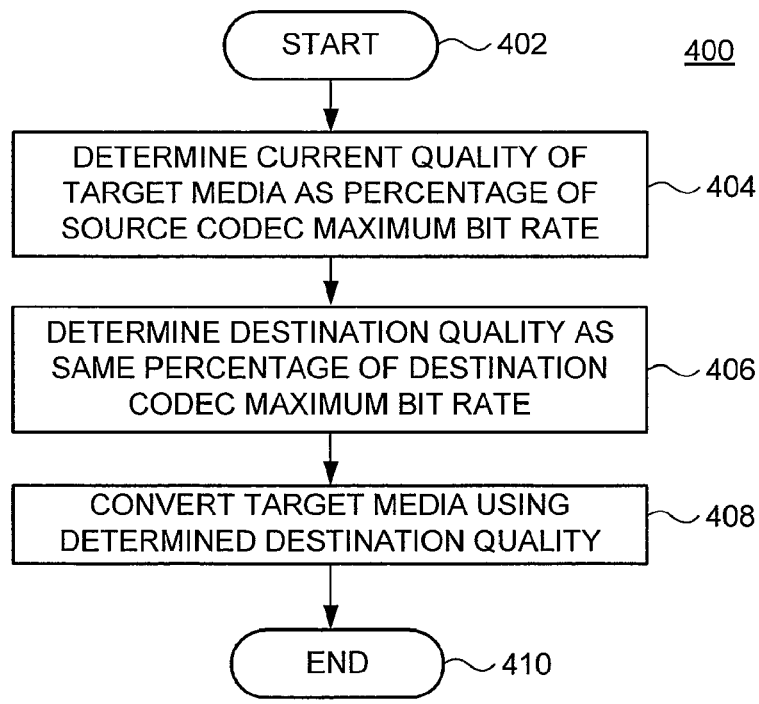
FIG. 4 is a flow diagram depicting a method for normalizing the perceptual quality in a media compression operation across codecs using a computer system implementing the system described with respect to FIG. 1 in accordance with embodiments of the present invention.
Figure 5:
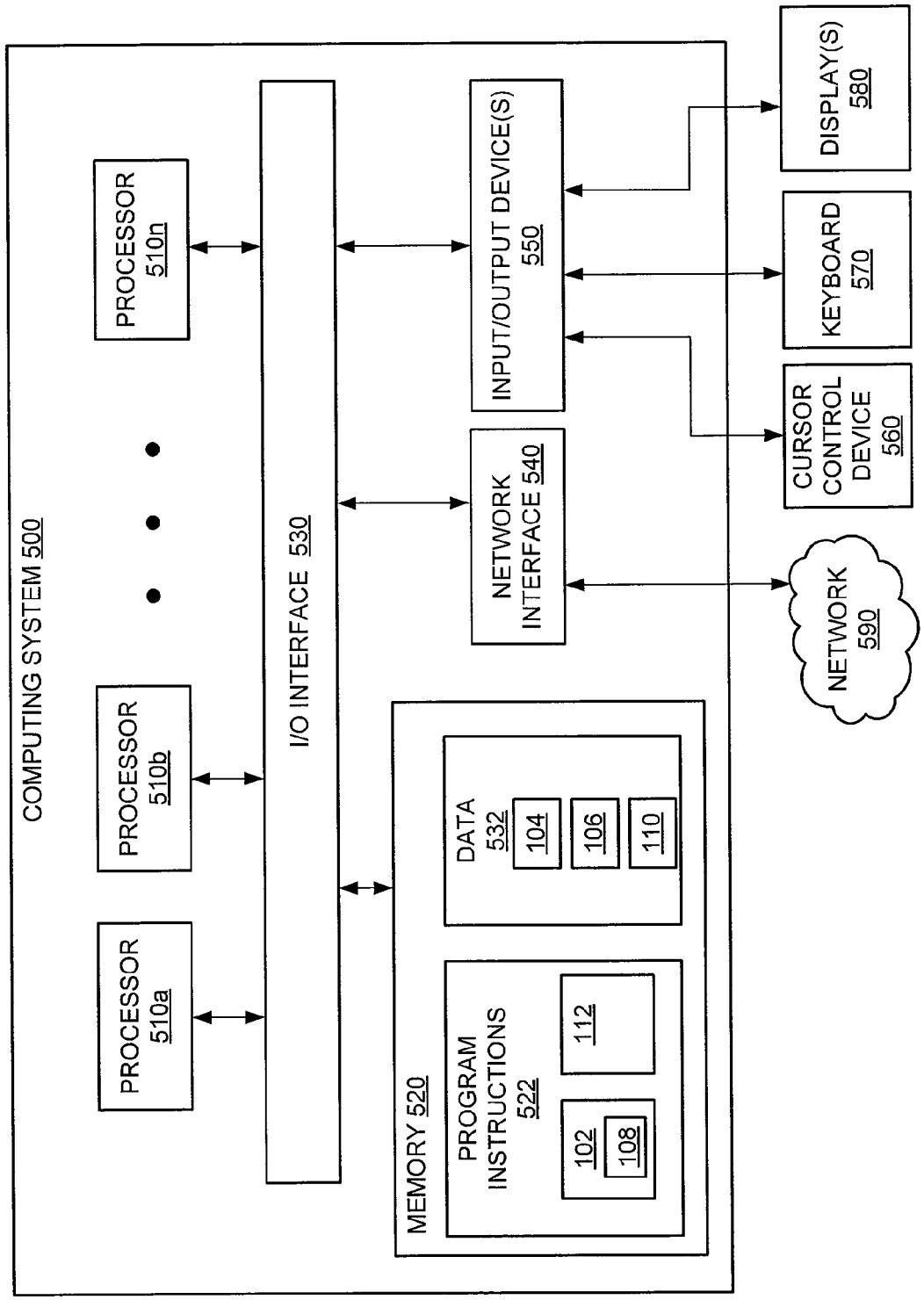
FIG. 5 is a detailed block diagram of an exemplary computer system for implementing the system described with respect to FIG. 1 and executing the methods described with respect to FIGS. 2-4, in accordance with embodiments of the present invention.

FIG. 4 is a flow diagram of a method 400 for normalizing the perceptual quality in a media compression operation across codecs. Each and every step of the method 400 may be implemented using a system (e.g., the system 100 of FIG. 1) that includes a media compression module (e.g., the media compression module 102 as described with respect to FIG. 1). In other embodiments, some steps are omitted or skipped. The system may include a computer system as described further below. The media compression module may implement one or more codecs (i.e., formats) in order to to perform compression and decompression operations as described below.

The method 400 begins at step 402 and proceeds to step 404. At step 404, the method 400 analyzes the target media file to determine a current quality level. The current quality level is determined by finding the maximum potential bit rate of the file with respect to the source codec of the file, and then determining the percentage of that maximum. This percentage represents the quality level associated with the media file as compared to the maximum possible quality level for the media file. After determining the current quality level of the media file, the method proceeds to step 406.

At step 406, the method 400 determines a destination quality level of the target media file that is compressed using a destination codec. The method 400 determines the destination quality level by computing a maximum bit rate of the media file of the destination codec, and then selecting a destination bit rate that corresponds to the same percentage of maximum bit rate using the destination codec as determined in relation to the source codec at step 404. For example, if a source codec had a maximum bit rate of 200 kb, and the media file was compressed to 100 kb, the quality level would be 50%. If the destination codec maximum bit rate was 50 kb, then the method 400 would convert the media file such that the destination bit rate was 50% of 50 kb, or 25 kb. After determining the destination quality level, the method 400 proceeds to step 408.

At step 408, the method 400 converts the media file using the destination codec at the destination quality as determined at step 406. The conversion operation results in a compressed media file, which is then stored on the local computer system or transmitted to a remote computer system. As such, the method 400 provides for maintaining of relative subjective quality across codecs. After converting the target media file and storing or transmitting the compressed media file, the method 400 ends at step 410.

Example Computer System

Various embodiments of a method and apparatus for normalizing perceptual quality when compressing media files as described herein may be executed on one or more computer systems, which may interact with various other devices. One such computer system is a computer system 500 illustrated by FIG. 5, which may in various embodiments implement any of the elements of functionality illustrated in FIGS. 1-4. In various embodiments, the computer system 500 may be configured to implement normalization of perceptual quality in image compression, as described above. While the illustrated system demonstrates the computer system 500 implementing normalizing perceptual quality in media compression, the computer system 500 may be used to implement any other system, device, element, functionality or method of the above-described embodiments. In the illustrated embodiments, the computer system 500 may be configured to implement normalizing perceptual quality in media compression as processor-executable program instructions 522 (e.g., program instructions executable by processor(s) 510a-510n) in various embodiments.

In the illustrated embodiment, the computer system 500 includes one or more processors 510a-510n coupled to a system memory 520 via an input/output (I/O) interface 530. The computer system 500 further includes a network interface 540 coupled to I/O interface 530, and one or more input/output devices 550, such as cursor control device 560, keyboard 570, and display(s) 580. In various embodiments, any of the components 560-580 may be utilized by application software such as, for example, the media compression module 102 for receiving input. In various embodiments, a user interface may be generated and displayed on the display 580. In some cases, it is contemplated that embodiments may be implemented using a single instance of the computer system 500, while in other embodiments multiple such systems, or multiple nodes making up the computer system 500, may be configured to host different portions or instances of various embodiments. For example, in one embodiment some elements may be implemented via one or more nodes of the computer system 500 that are distinct from those nodes implementing other elements. In another example, multiple nodes may implement the computer system 500 in a distributed manner.

In different embodiments, the computer system 500 may be any of various types of devices, including, but not limited to, a personal computer system, desktop computer, laptop, notebook, or notebook computer, mainframe computer system, handheld computer, workstation, network computer, a camera, a set top box, a mobile device, a consumer device, application server, or in general any type of computing or electronic device that is capable of having software installed.

In various embodiments, the computer system 500 may be a uniprocessor system including one processor 510a, or a multiprocessor system including several processors 510a-510n (e.g., two, four, eight, or another suitable number). The processors 510a-510n may be any suitable processor capable of executing instructions. For example, in various embodiments the processors 510a-510n may be general-purpose or embedded processors implementing any of a variety of instruction set architectures (ISAs), such as the x86, PowerPC, SPARC, or MIPS ISAs, or any other suitable ISA. In multiprocessor systems, each of the processors 510a-510n may commonly, but not necessarily, implement the same ISA.

System memory 520 may be configured to store program instructions 522 and/or data 532 accessible by the processors 510a-510n. In various embodiments, the system memory 520 may be implemented using any suitable memory technology, such as static random access memory (SRAM), synchronous dynamic RAM (SDRAM), nonvolatile/Flash-type memory, or any other type of memory. In the illustrated embodiment, various software modules (e.g., program instructions) and data implementing any of the elements of the embodiments described above may be stored within the system memory 520. In other embodiments, program instructions and/or data may be received, sent or stored upon different types of computer-accessible media or on similar media separate from the system memory 520 or the computer system 500. The various software modules (e.g., instructions) are executed by processor(s) 510a-510n to perform media compression operations according to various embodiments.

In some embodiments, the media compression module 102 and the quality setting module 112 include processor-executable instructions stored in the system memory 520. Furthermore, the system memory 520 stores the target media file 104, the compressed media file 106 and the quantizer data 110. The quality setting module 112 provides a user interface for processing user input regarding a quality setting for the compressed media file 106. When executed by the processor(s) 510a-510n, the media compression module 102 normalizes perceptual quality when converting the target media file 104 into the compressed media file 106 using the quantizer data 110. The media compression module 102 includes an analyzer for determining a maximum bit rate for the target media file 104 of which the quality setting is a percentage.

In one embodiment, the I/O interface 530 may be configured to coordinate I/O traffic between the processors 510a-510n, system memory 520, and any peripheral devices in the device, including the network interface 540 or other peripheral interfaces, such as the input/output devices 550, In some embodiments, the I/O interface 530 may perform any necessary protocol, timing or other data transformations to convert data signals from one components (e.g., system memory 520) into a format suitable for use by another component (e.g., processors 510a-510n). In some embodiments, the I/O interface 530 may include support for devices attached through various types of peripheral buses, such as a variant of the Peripheral Component Interconnect (PCI) bus standard or the Universal Serial Bus (USB) standard, for example. In some embodiments, the function of the I/O interface 530 may be split into two or more separate components, such as a north bridge and a south bridge, for example. Also, in some embodiments some or all of the functionality of the I/O interface 530, such as an interface to the system memory 520, may be incorporated directly into the processors 510a-510n.

The network interface 540 may be configured to allow data to be exchanged between the computer system 500 and other devices attached to a network (e.g., network 590), such as one or more external systems or between nodes of the computer system 500. In various embodiments, the network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, the network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The Input/output devices 550 may, in some embodiments, include one or more display terminals, keyboards, keypads, touchpads, scanning devices, voice or optical recognition devices, or any other devices suitable for entering or accessing data by one or more computer systems. Multiple input/output devices may be present in the computer system 500 or may be distributed on various nodes of the computer system 500. In some embodiments, similar input/output devices may be separate from the computer system 500 and may interact with one or more nodes of the computer system 500 through a wired or wireless connection, such as over the network interface 540.

In some embodiments, the illustrated computer system may implement any of the methods described above, such as the methods illustrated by the flowcharts of FIGS. 2-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The foregoing embodiments comprise a number of elements and/or modules that perform various functions as described. The elements and/or modules are exemplary implementations of means for performing their respective functions.

While the foregoing is directed to embodiments of the present invention, other and further embodiments of the invention may be devised without departing from the basic scope thereof, and the scope thereof is determined by the claims that follow.

The invention claimed is:

1. A computer implemented method for normalizing perceptual quality in media compression, comprising:
   determining a maximum bit rate for a target media file using a computer;
   determining a quality setting for the target media file using the computer, wherein the quality setting is a specific percentage of the maximum bit rate; and
   compressing the target media file to a bit rate equal to the specific percentage of the maximum bit rate using the computer.

2. The computer implemented method of claim 1, wherein compressing the target media file further comprising:
   compressing the target media file to a higher bit rate than the determined quality setting; and
   selecting bits of the compressed target media file to store in a second compressed target media file having a bit rate equal to the determined quality setting.

3. The computer implemented method of claim 1, wherein determining the maximum bit rate further comprises:
   determining a smallest quantizer value for a destination format of the target media file.

4. The computer implemented method of claim 1, wherein determining the quality level further comprises:
   determining a maximum potential bit rate of the target media file with respect to a source codec of the target media file.

5. The computer implemented method of claim 1, further comprising:
   determining a single quality setting for a plurality of media files; and
   compressing each media file of the plurality of media files to a bit rate equal to the specific percentage multiplied by the maximum bit rate for the each media file.

6. The computer implemented method of claim 1, wherein the maximum bit rate is determined by identifying the bit rate of the target media file where a quantizer value is equal to one.

7. A computer implemented method for normalizing perceptual quality in media compression, comprising:
   determining a first maximum bit rate for a target media file encoded using a first codec using a computer;
   determining a current bit rate of the target media file using the computer;
   determining a quality level of the target media file by comparing the current bit rate with the maximum bit rate using the computer, where the quality level is a percentage value equal to the current bit rate divided by the first maximum bit rate;
   determining a second maximum bit rate for the target media file as converted using a second codec using the computer; and
   converting the target media file into a compressed media file using the second codec with a bit rate setting equal to the second maximum bit rate multiplied by the quality level using the computer.

8. The computer implemented method of claim 7, wherein determining the maximum bit rate further comprises:
   determining a smallest quantizer value for a destination format of the target media file.

9. The computer implemented method of claim 7, wherein converting the target media file into a compressed media file further comprising:
   compressing the target media file to a higher bit rate than the determined quality setting; and
   selecting bits of the compressed target media file to store in a second compressed target media file having a bit rate equal to the determined quality setting.

10. The computer implemented method of claim 7, wherein determining the quality level further comprises:
    determining a maximum potential bit rate of the target media file with respect to a source codec of the target media file.

11. The computer implemented method of claim 7, further comprising:
    determining a single quality setting for a plurality of media files; and
    compressing each media file of the plurality of media files to a bit rate equal to the specific percentage multiplied by the maximum bit rate for the each media file.

12. A non-transitory computer readable storage medium for storing software that, when executed by a computing system, causes a computing system to perform a method that comprises:
   determining a maximum bit rate for a target media file;
   determining a quality setting for the target media file, wherein the quality setting is a specific percentage of the maximum bit rate;
   compressing the target media file to a bit rate equal to the specific percentage of the maximum bit rate multiplied by the maximum bit rate.

13. The non-transitory computer readable storage medium of claim 12, further comprising:
   determining a smallest quantizer value for a format of the target media file.

14. The non-transitory computer readable storage medium of claim 12, further comprising:
   compressing the target media file to a higher bit rate than the determined quality setting; and
   selecting bits of the compressed target media file to store in a second compressed target media file having a bit rate equal to the determined quality setting.

15. The non-transitory computer readable storage medium of claim 12, further comprising:
   determining a single quality setting for a plurality of media files; and
   compressing each media file of the plurality of media files to a bit rate equal to the specific percentage multiplied by the maximum bit rate for the each media file.

16. An apparatus for normalizing perceptual quality in media compression comprising:
   a media compression module for determining a maximum bit rate for a target media file, determining a quality setting associated with the target media file, wherein the quality setting is a specific percentage of the maximum bit rate and compressing the target media file to a bit rate equal to the specific percentage of the maximum bit rate multiplied by the maximum bit rate.

17. The apparatus of claim 16, wherein the media compression module further comprises an analyzer for determining a smallest quantizer value for a destination format of the target media file.

18. The apparatus of claim 16, wherein the media compression module compresses the target media file to a higher bit rate than the determined quality setting and select bits of the compressed target media file to store in a second compressed target media file having a bit rate equal to the determined quality setting.

19. The apparatus of claim 16, wherein the media compression module determines a maximum potential bit rate of the target media file with respect to a source codec of the target media file.

20. The apparatus of claim 16, wherein the media compression module determines a single quality setting for a plurality of media files and compresses each media file of the plurality of media files to a bit rate equal to the specific percentage multiplied by the maximum bit rate for the each media file.

* * * * *